(12) United States Patent
Walk

(10) Patent No.: US 11,406,925 B2
(45) Date of Patent: Aug. 9, 2022

(54) FILTER SUPPORT, FILTER ASSEMBLY INCLUDING FILTER SUPPORT, AND METHOD OF MODIFYING FILTER USING FILTER SUPPORT

(71) Applicant: Walk Industrial, Inc., Murrieta, CA (US)

(72) Inventor: Tyler G. Walk, Mattoon, IL (US)

(*) Notice: Subject to any disclaimer, the term of this patent is extended or adjusted under 35 U.S.C. 154(b) by 371 days.

(21) Appl. No.: 16/778,735

(22) Filed: Jan. 31, 2020

(65) Prior Publication Data
US 2020/0276531 A1  Sep. 3, 2020

Related U.S. Application Data

(60) Provisional application No. 62/799,741, filed on Jan. 31, 2019.

(51) Int. Cl.
*B01D 46/00* (2022.01)
*B01D 46/42* (2006.01)

(52) U.S. Cl.
CPC ..... *B01D 46/0005* (2013.01); *B01D 46/4227* (2013.01); *B01D 2265/06* (2013.01)

(58) Field of Classification Search
CPC ............ B01D 46/0005; B01D 46/4227; B01D 46/02; B01D 46/06; B01D 2265/06
See application file for complete search history.

(56) References Cited

U.S. PATENT DOCUMENTS 10,758,857 B2  9/2020  Walk et al.
2016/0228800 A1*  8/2016  Walk ................. B01D 46/2411

\* cited by examiner

*Primary Examiner* — Robert Clemente
(74) *Attorney, Agent, or Firm* — Stinson LLP

(57) ABSTRACT

A filter support for a filter is adjustable to modify the size and/or shape of the filter. The filter support may include one or more wedges engaging a wall of the filter, and a connector connecting the one or more wedges to one another. The connector allows selective adjustment of the filter support.

3 Claims, 14 Drawing Sheets

FILTER SUPPORT, FILTER ASSEMBLY INCLUDING FILTER SUPPORT, AND METHOD OF MODIFYING FILTER USING FILTER SUPPORT

CROSS-REFERENCE TO RELATED APPLICATIONS

The present application claims priority to U.S. Provisional Application Ser. No. 62/799,741, filed Jan. 31, 2019, the entirety of which is hereby incorporated by reference.

FIELD OF THE DISCLOSURE

The field of the disclosure relates generally to filter supports for use with filter assemblies that filter particulate material from a flow.

BACKGROUND

Generally, filters used in commercial applications are prone to degradation and structural instability when particulate accumulates on and around the filters. Accordingly, there is a need for a filter support that is increases the useful life of known filters.

FIGS. 11-15 show an embodiment of a conventional filter 300 for use with a filtration system. This filter 300 includes a front side 303 having a first aperture 304 and a back side wall 305. First aperture 304 is defined by a front top edge 306, a front bottom edge 308, a front first side edge 310, and a front second side edge 312. In the exemplary embodiment, filter media 301 extends from back side wall 305 to front side 303 a distance 311 and encloses a frame 314 to form first aperture 304. In the exemplary embodiment, distance 311 (i.e., depth of filter 300) is 17 inches (43.2 cm). However, distance 311 can be any distance that facilitates filtration as described herein.

Filter 300 also includes a top filter wall 320, a bottom filter wall 330, a first side filter wall 340, and a second side filter wall 350. A plurality of vanes 352 extend through filter media 301 from top filter wall 320 to bottom filter wall 330 to form a second aperture 360 in filter 300. A cross-sectional dimension of inner plenum 309 decreases (e.g., tapers) from front side 302 toward back wall 305 to an intermediate location 313 between front side and back wall to define a front plenum section (i.e., upstream plenum section) 309a. The inner surface of only one pair of opposing the side walls partially defining the front plenum section 309a extends inward at an angle relative to a longitudinal axis LA of the filter, although each side wall may extend inward. Moreover, only one cross-sectional dimension of inner plenum increases (e.g., flares) from intermediate location 313 toward (e.g., to) back wall 305 to define a rear plenum section (i.e., downstream plenum section) 309b, although each side wall may flare. Intermediate location 313 defines a second aperture (or neck) 350 leading to rear plenum section and flowably coupling front and read plenum sections to one another. A cross-sectional area of first aperture 304 is greater than cross-sectional area of second aperture 360. For example, the cross-sectional area of first aperture 304 may be from about 0.5 times to about 20 times greater than cross-sectional area of second aperture 360. Thus, the illustrated inner plenum 309 and filter 300 has a generally hourglass shape in cross section taken in only one cross-sectional plane. Plenum and/or filter may have other shapes.

Fasteners (e.g., vanes 352) fasten opposing side walls 307 at or near the intermediate location (e.g., midpoint of length 311) to form the hourglass shape in cross section. In the exemplary embodiment, fasteners (e.g., vanes) 352 extend for a length of 6 inches (15.24 cm) forming the second aperture 360 to be approximately a 20 inch by 2 inch (50.8 cm by 5.08 cm) rectangle. Additionally, the use of 5 inch (12.7 cm) vanes 352 at the midpoint of length 311 forms an aperture angle α on filter walls 320 and 330. In such an embodiment, aperture angle α is approximately 109°. Alternatively, vanes 352 can have any length and be positioned at any location along length 311 of filter 300 to form any sized second aperture 360 having any shape. In some embodiments, vanes 352 are positioned between walls 320 and 330 as well as between walls 340 and 350.

In operation, particulate-laden (e.g., dirty) air flow D enters inner plenum 309 through first aperture 304 and clean air flow C is discharged through at least one of side wall 307 (e.g., filter walls 320, 330, 340, and 350) and back wall 305 towards motor or blower 112 (shown in FIG. 1). More specifically, particulate-laden flow D enters front plenum section 309a through first aperture 304 and particulate begins to accumulate on inner or particulate side 307 of walls 320, 330, 340, and 350 defining front plenum section (i.e., first or upstream filter body 300a). As such, filter media of first filter portion 300a acts as a first filter body that is upstream of back wall 305. It is believed that at this stage, most of the filtering is done by first filter body 300a. As particulate accumulates on particle side 307 of first filter body 300a, second aperture 360 begins to draw flow into second plenum portion 309b. As flow D enters second or downstream plenum section 309b through second aperture 360, the flow is redirected or spread across particulate side 307 of portions of walls 320, 330, 340, and 350 and back wall 305 defining second (or downstream) plenum portion 309b (i.e., second or downstream filter body 300b). In some embodiments, as particulate begins to accumulate on particulate side 307 of back wall 305 a loss of suction in will occur in the areas receiving particulate accumulation which will redirect flow D to a portion of back wall 305 having less accumulation.

SUMMARY

In one aspect, a filter support for a filter is adjustable to modify at least one of a size and shape of the filter. A filter assembly includes the filter support and the filter. A method provides adjustment of at least one of the size and shape of the filter using the filter support. The filter support may adjust a size and or shape of a throat of the filter or other opening defined by the filter.

In another aspect, a filter support generally comprises first and second wedges configured to engage at least one wall of a filter, and a connector extending between and connecting the first and second wedges to one another. The connector is adjustable to change a distance between the first and second wedges to modify at least one of a size and shape of the filter.

In yet another aspect, a filter assembly generally comprises a filter including at least one wall of a filter material configured to filter particulate from an airflow; and a filter support configured to support the filter. The filter support includes first and second wedges engaging said at least one wall of the filter, and a connector extending between and connecting the first and second wedges to one another. The connector is adjustable to change a distance between the first and second wedges to modify at least one of a size and shape of the filter.

In a further aspect, a method of configuring a filter assembly generally comprises engaging at least one wall of a filter with first and second wedges, wherein the first and second wedges are connected by an adjustable connector; and adjusting the adjustable connector to change a distance between the first and second wedges to modify at least one of a size and shape of the filter.

DETAILED DESCRIPTION

Described herein is a filter support (e.g., a filter clamp) configured to extend around the exterior of a filter or configured to be received or integrated into the interior of the filter. The filter support is configured to compress or depress the form of the filter to produce a desired shape, such as the shape of the filter 300 described in the background and shown in FIGS. 12-16. For example, the filter support may replace the vanes 352 in the filter 300 or the filter support may be used in addition to the vanes or other structure support forming the shape of the filter. The filter support may be configured to form additional desired shapes, such as other filter shapes described in U.S. patent Ser. No. 15/978,386, filed May 14, 2018, the entirety of which is hereby incorporated by reference. In one embodiment, the filter support is configured to allow a user to control the shape and/or size of a throat (or other opening) of the filter to extend the life of the filter. The filter support can be adjustable allowing for ease of filter modification. The filter support may enable a user/manufacture to acquire the desired shape in order to target the maximum capability of a filter. The filter support may be any shape (square, rectangle, triangle, hexagon, octagon, and circle) and size and made of any material (plastic, metal, wood, fiberglass, carbon fiber, foam, and cardboard) that will hold form. The filter support can also, have extremities (spikes/cleats) on it to allowing it to grip onto filter media or any other material that is being used. The extremities can also produce support/shape forming for the direct or indirect media being used in the filtering process. The filter support can made from one single piece or multiple different pieces.

The filter support can be placed on the interior, exterior, integrated into the media, or a combination of both, either during manufacture of the filter assembly or later by the user. The filter support can be composed of one or multiple different adjustments. The support may be one that is universal for all the many different filter sizes and one that can easily be adjusted by the end user to accommodate whatever environment they might be using it in.

In one embodiment, the filter support includes a wedge or spacer which provides support to the filter to so that the filter will hold its shape or form. This will prevent the filter from collapsing or closing in on itself preventing it from premature failure. The wedge or spacer can be produced of any material (plastic, foam, glass cardboard, other media, fiberglass, carbon fiber or wood). The wedge or spacer can be located in the interior, exterior, or integrated into the media.

Figure 1A:
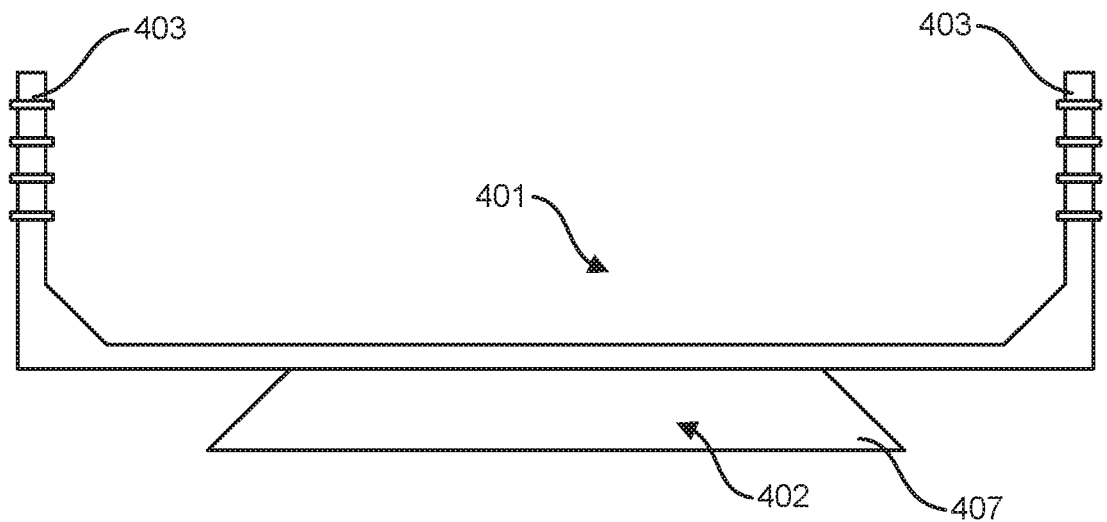
FIG. 1A is a front elevation of a female clamp portion of a filter support.
Figure 1B:
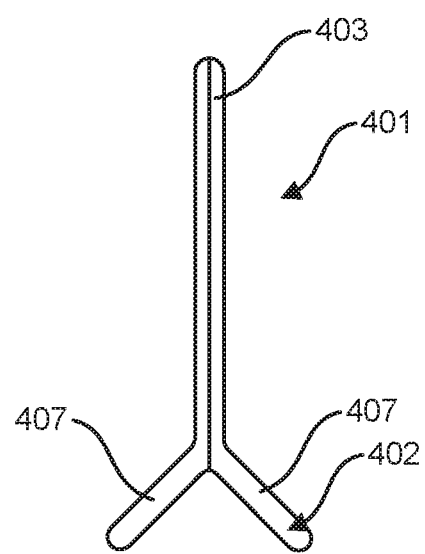
FIG. 1B is a side elevation of the female clamp portion.

FIG. 1 is a perspective view of a female clamp portion 401 of a filter clamp assembly (broadly, a filter support). The female clamp portion 401 mates with a male portion 501 (shown in FIG. 6) to form the clamp assembly. The clamp assembly is adjustable, such as by adjusting the height of the clamp assembly. The filter clamp assembly is designed to aid in the functionality of a filter (e.g., box filter). The U-shaped configuration of the female clamp portion 401, as well as the male portion 501, will enable the clamp assembly to at least hold the shape of a filter, give different shapes to a filter, and/or extend the life of the filter. The female clamp portion 401 and the male clamp portion 501 each includes a wedge 402, 502 which facilitates formation of the throat or tapered portion of the filter 300.

Figure 2:
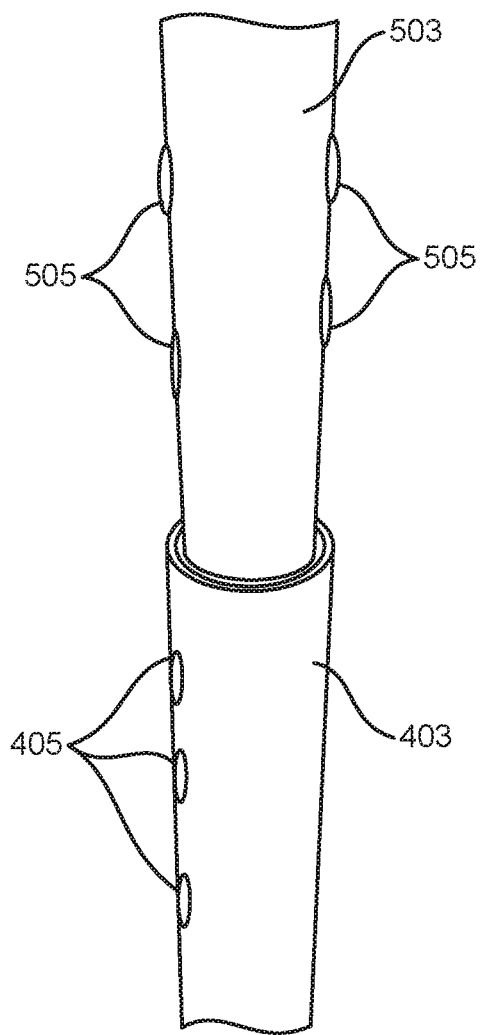
FIG. 2 is a perspective view of a portion of a male clamp portion being inserted into the female clamp portion shown in FIG. 1A.

FIG. 2 is a perspective view of a portion of the female clamp portion 401 shown in FIG. 1. Female clamp portion 401 includes a substantially hollowed female tube 403 or strut (broadly, a connector or a portion of a connector). Tube 403 enables a male strut 503 or tube (broadly, a connector or a portion of the connector) to mate into the substantially hollowed portion to form a one solid piece.

Figure 3:
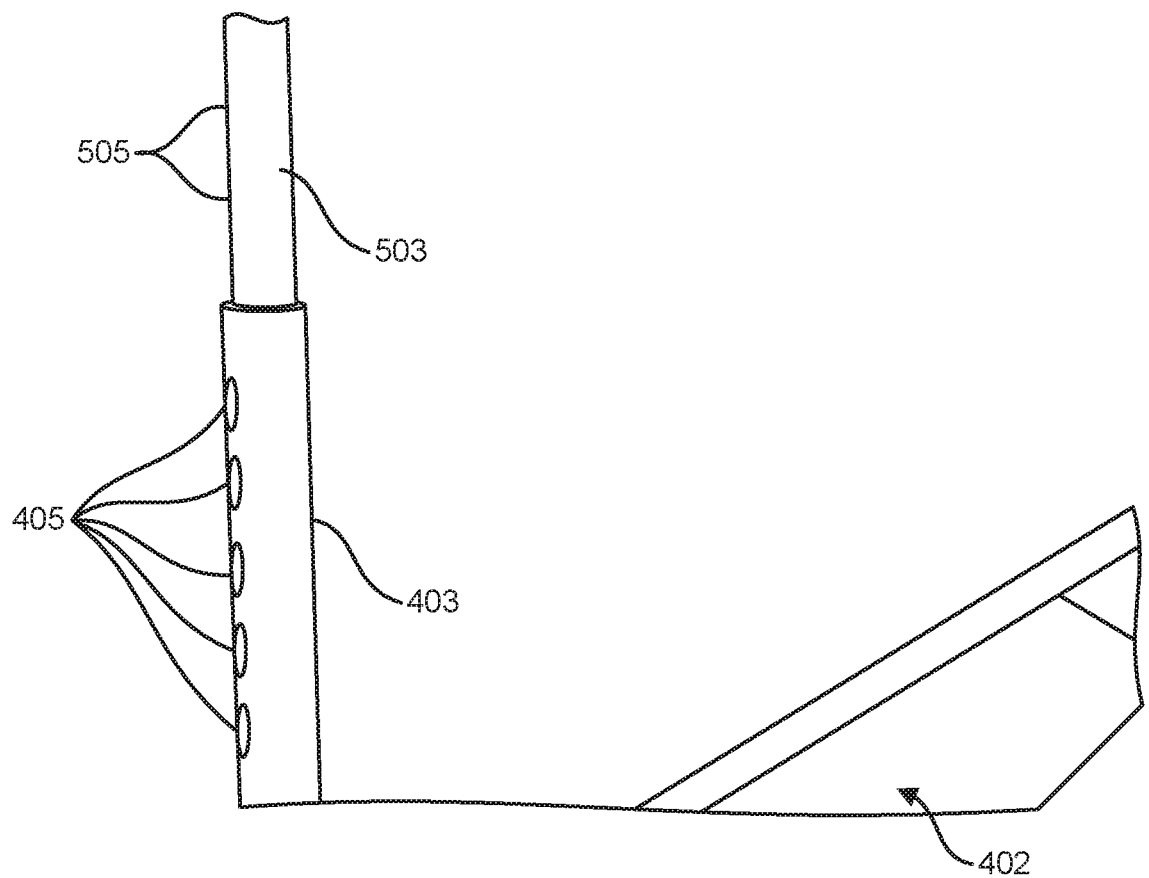
FIG. 3 is a perspective view of a portion of a male clamp portion being inserted into the female clamp portion shown in FIG. 1A.

FIG. 3 is a perspective view of a portion of the female clamp portion 401 shown in FIG. 1. In the exemplary embodiment, a plurality of apertures 405 are provided within female strut 403 of female clamp portion 401. The apertures are formed to accommodate barbs or detents 505 that extend from the surface of male strut 503 of male clamp portion 501. Mating the male and female clamp portions 401 and 501 together enables a user to form a desired size of the neck of the filter. In some embodiments, the wedges 402 of the male and female clamp portions 401 and 501 include one or more fins 407, 507 (e.g., two fins). The fins 407, 507 are oriented in a predetermined angle to maintain a gap around the neck of a filter. The fins 407 maintain a gap in the filter 300 such that adjacent walls of a filter do not collapse on one another as particulate begins to build on the filter. Such a gap may facilitate the ability of the filter to work once weight and/or particulate is added to the filter. Additionally, fins 407, 507 create an air gap between adjacent filter walls that allows the filter to breath longer which prolongs the useful life of a filter. Without fins 407, 507, the filter 300 may will pinch around the neck which will cut off the airflow early in the filtering process.

Figure 4:
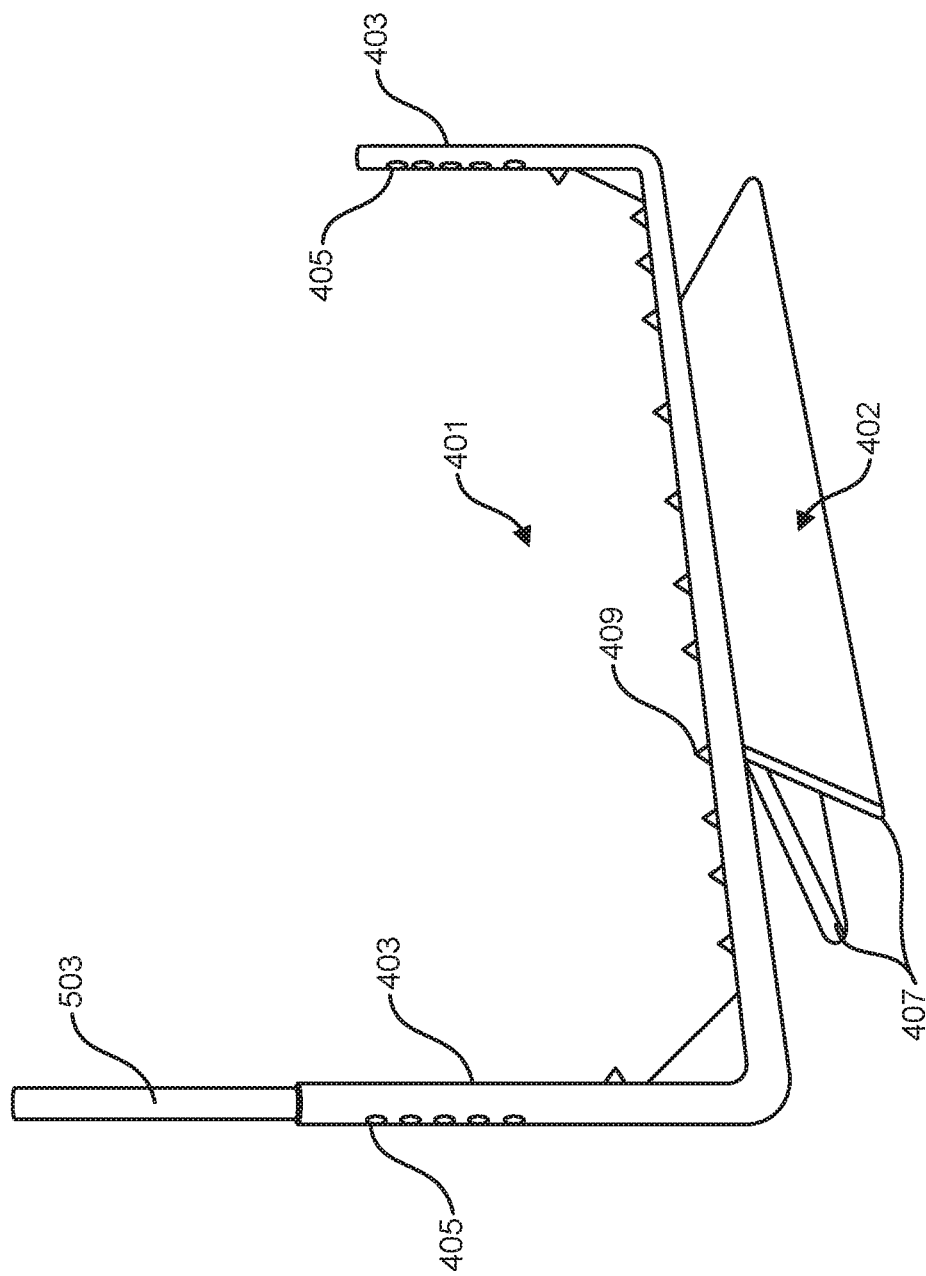
FIG. 4 is a perspective view of the female clamp portion as shown in FIG. 1.

FIG. 4 is a perspective view of a female clamp portion 401 as shown in FIG. 1. In some embodiments, spikes or cleats 409 extend from the surface of struts 403. Spikes 409 hold and grip filter media and aid in maintaining the position of the filter 300 in a designated location which will also add stability to the clamp and filter.

Figure 5:
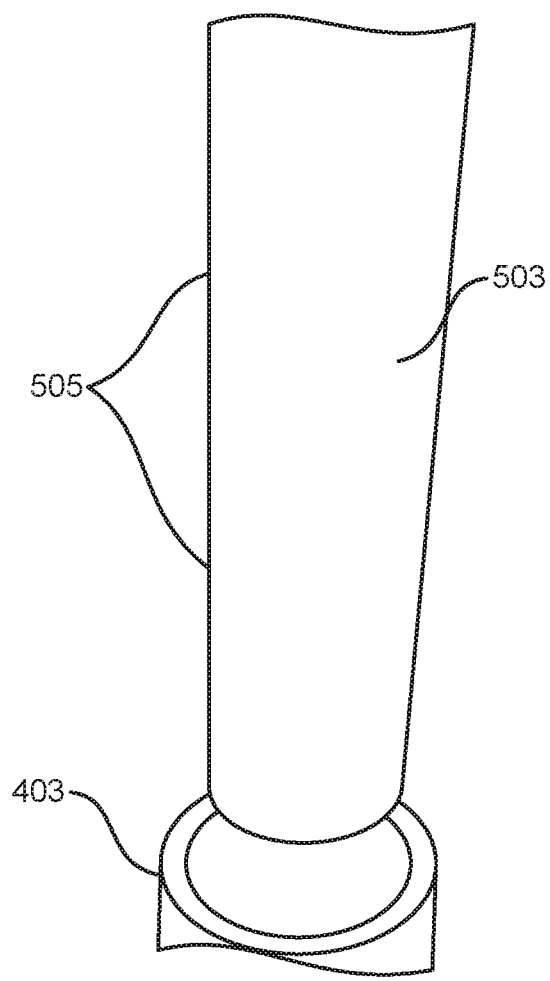
FIG. 5 is perspective view of a portion of the male clamp portion shown in FIG. 6.
Figure 6A:
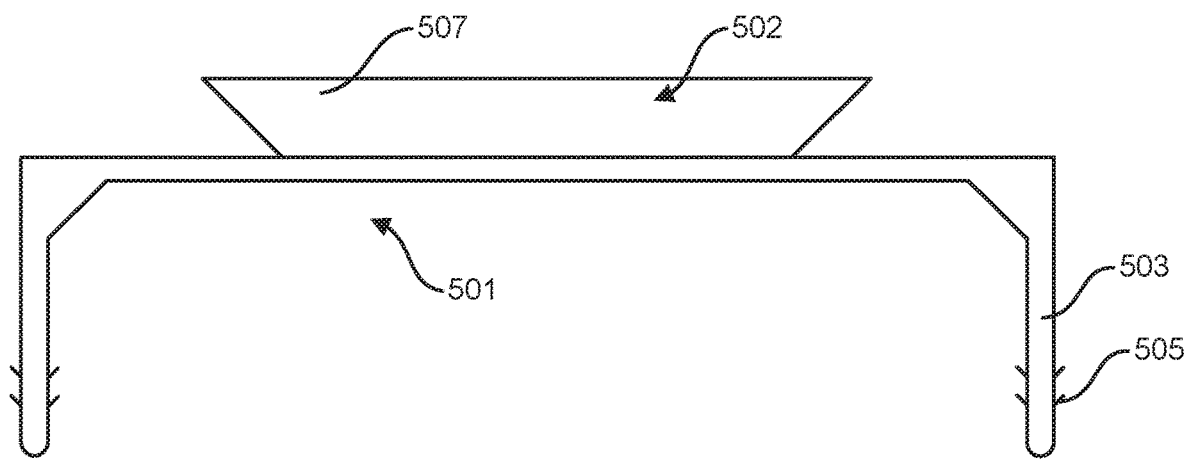
FIG. 6A is a front elevation of the male clamp portion of the filter support.
Figure 6B:
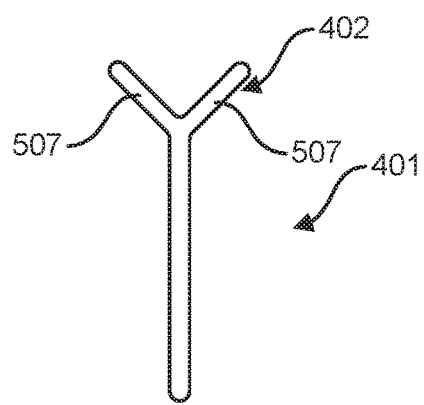
FIG. 6B is a side elevation of the male clamp portion.

FIG. 5 is a perspective view of a portion of a male clamp portion 501 shown in FIG. 6. In the exemplary embodiment, male clamp portion 501 is configured to fit into female clamp portion 401 which will give it a form fitting one piece look and feel.

In some embodiments, barbs or ratchets or detents 505 extend from male clamp portion 401 to enable attachment of male and female clamp portions 401 and 501. Barbs or ratchets or detents 505 are configured to primarily only go in one direction to allow the filter clamp assembly 100 to decrease the gap or aperture of the filter in size. Barbs or ratchets 505 are not meant to be pulled out but could be manufactured to go in multiple directions if needed. Having a one directional ratchet clamp will give it a onetime use per filter. Having multiple directional ratchet for the filter clamp could give it a multipurpose use.

Figure 7:
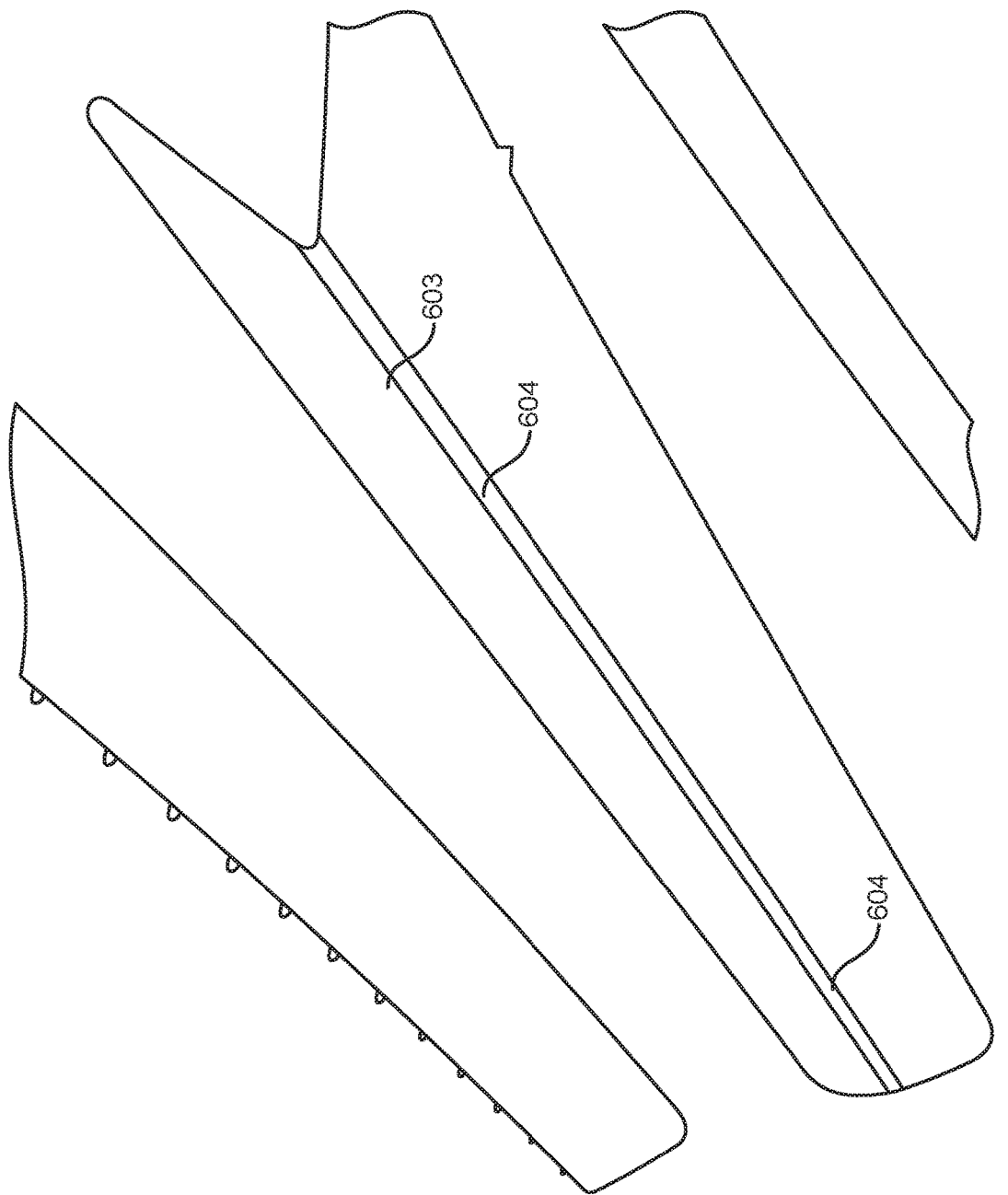
FIG. 7 is a perspective of a wedge of another embodiment of a filter support.
Figure 8:
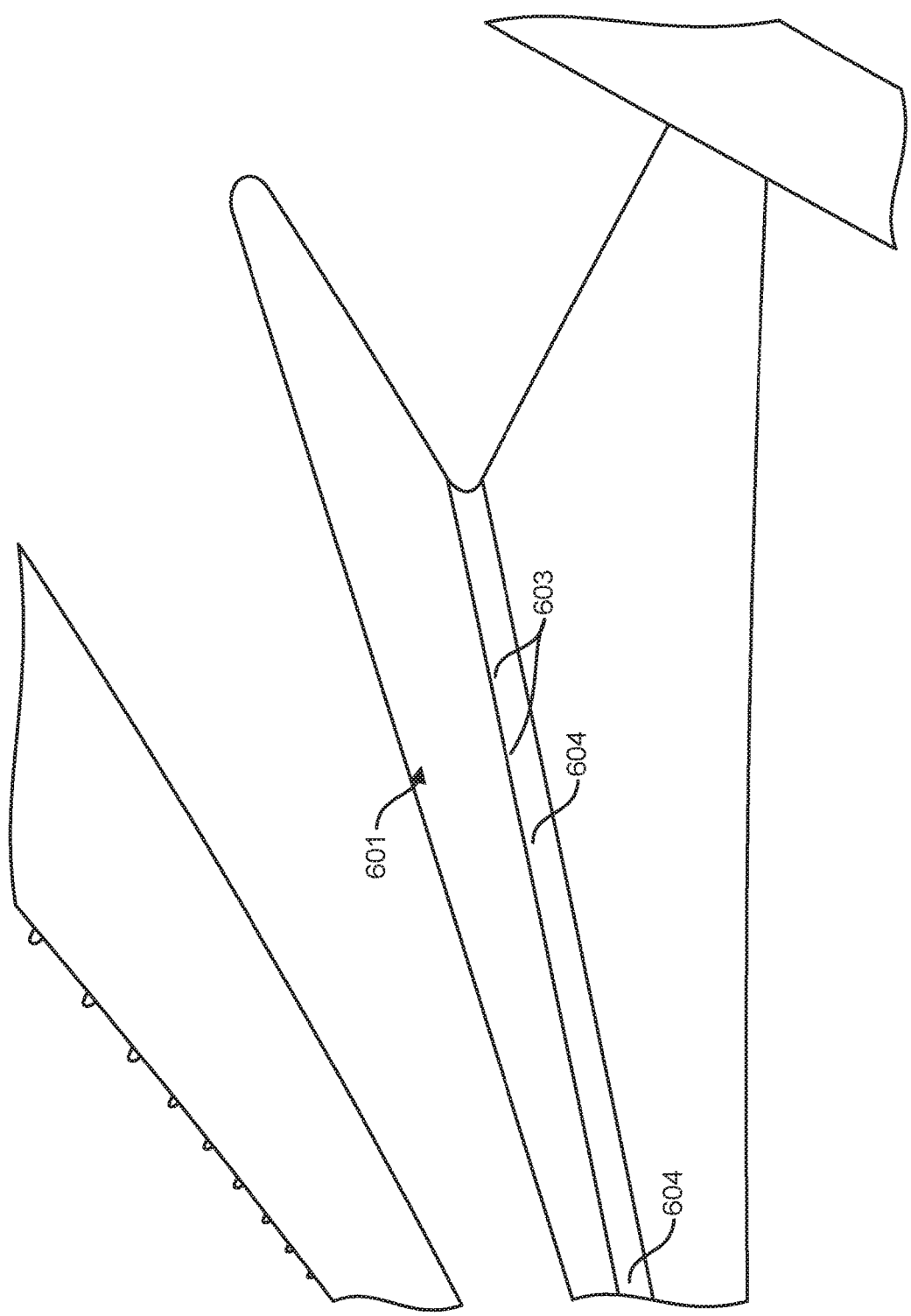
FIG. 8 is a perspective of a wedge of another embodiment of a filter support.

FIGS. 7 and 8 are perspective views of a wedge 601 of a filter support. The wedge 601 can be used at the top and the bottom of the filter 300 and/or the left and right sides of the filter to provide adjustment and support for a continual air gap. A similar clamp to wedge 601 can be used on all sides including the interior or in between product. By way of example and not limitation, wedge 601 is configured to be used on the exterior of the filter 300 on against adjacent walls 803 and 805 (shown in FIG. 10).

In some embodiments, spikes 603 extend from wedge 601 to hook or latch onto the filter media to give them grip to keep the clamp/spacer in a desired location. Wedge 601 includes an attachment aperture 604 to enable wedge 601 to be removably coupled to clamp assembly 100.

Wedge 601 forms a gap, space, or void that prevents the filter from closing in on itself due to weight or poor air flow. The gap created by wedge 601 allows the filter 300 to remain open and continually breathe extending the life of the filter. It allows adjacent surfaces or sidewalls of a filter 300 (e.g., 803 and 805) not to come in contact with one another.

Figure 9:
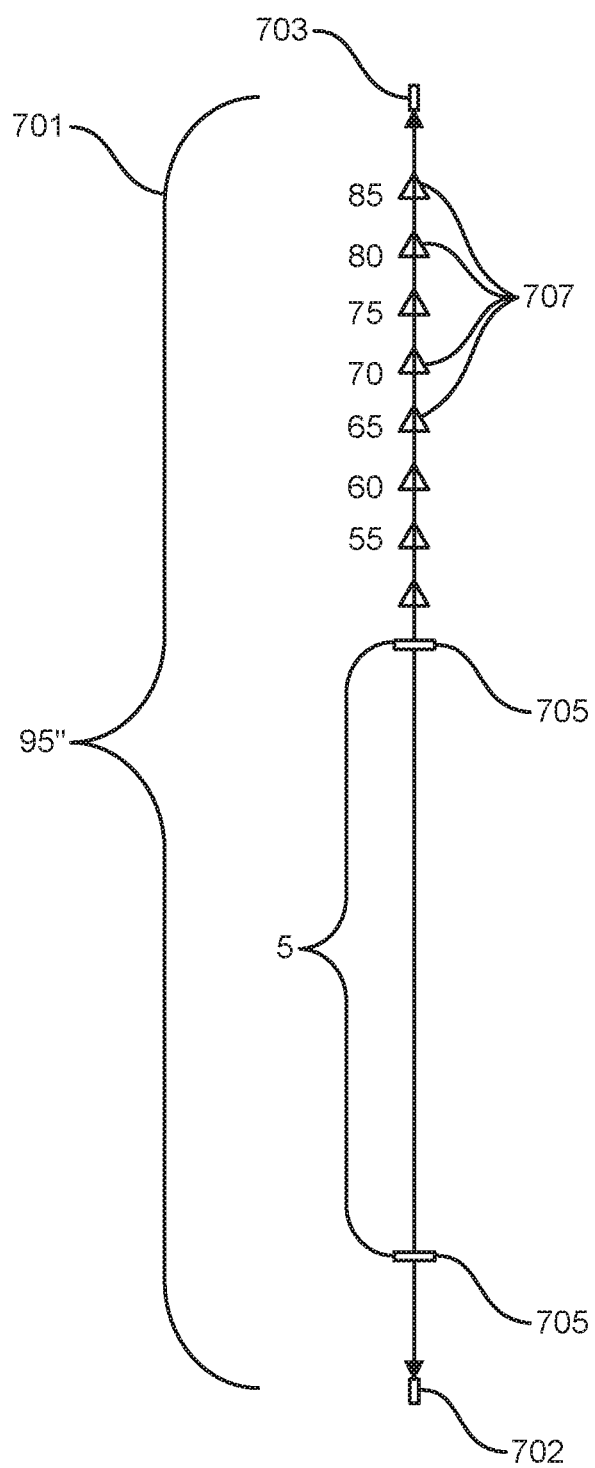
FIG. 9 is a front elevation of a vane for use with one or more wedges of FIG. 8.
Figure 11:
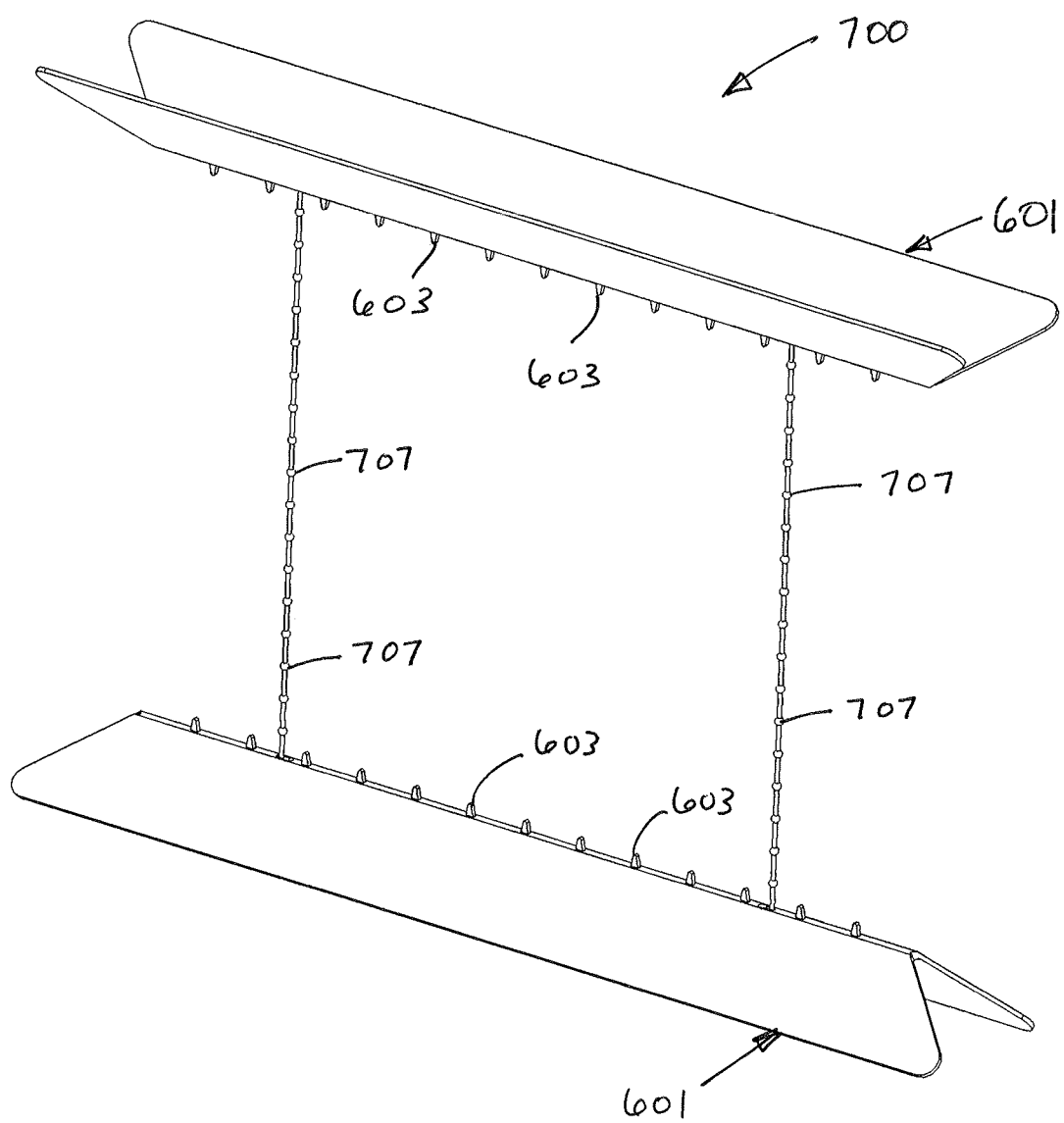
FIG. 11 is a filter support including the wedges and the vanes.
Figure 12:
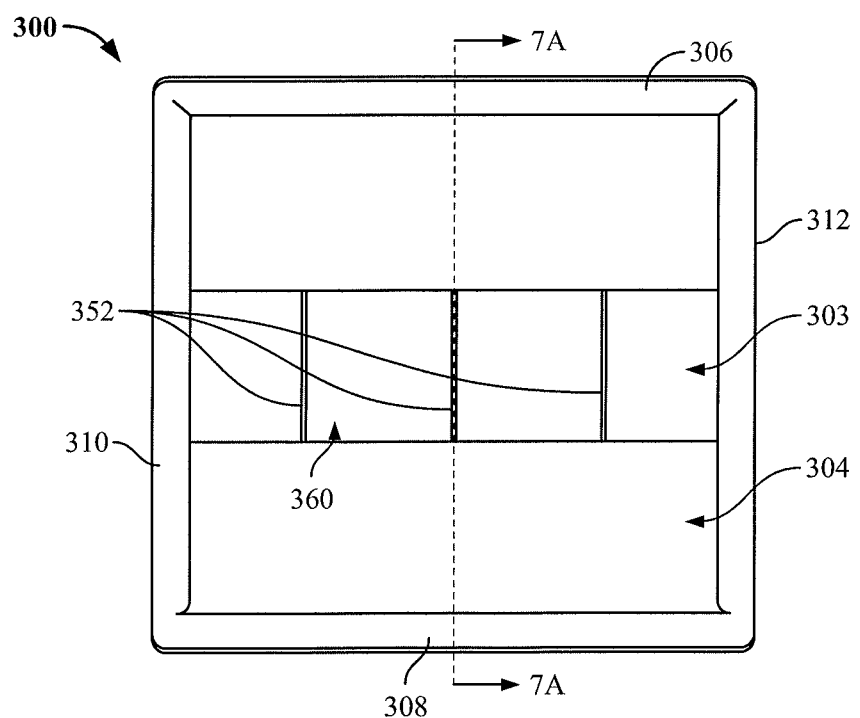
FIG. 12 is a front elevation of conventional filter assembly including vanes.
Figure 13:
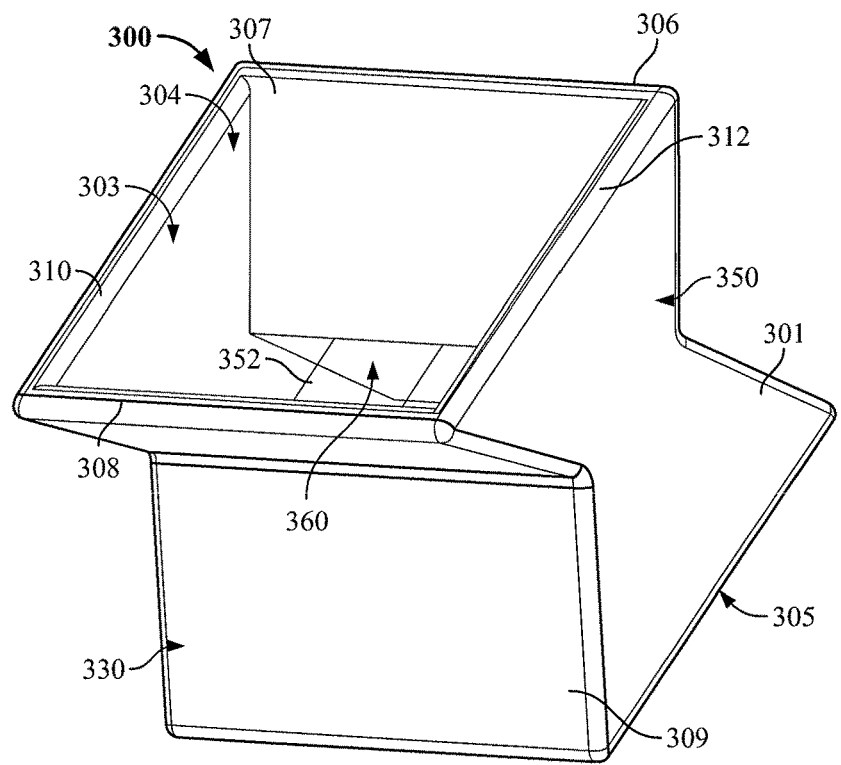
FIG. 13 is a front perspective of the conventional filter assembly of FIG. 12.
Figure 14:
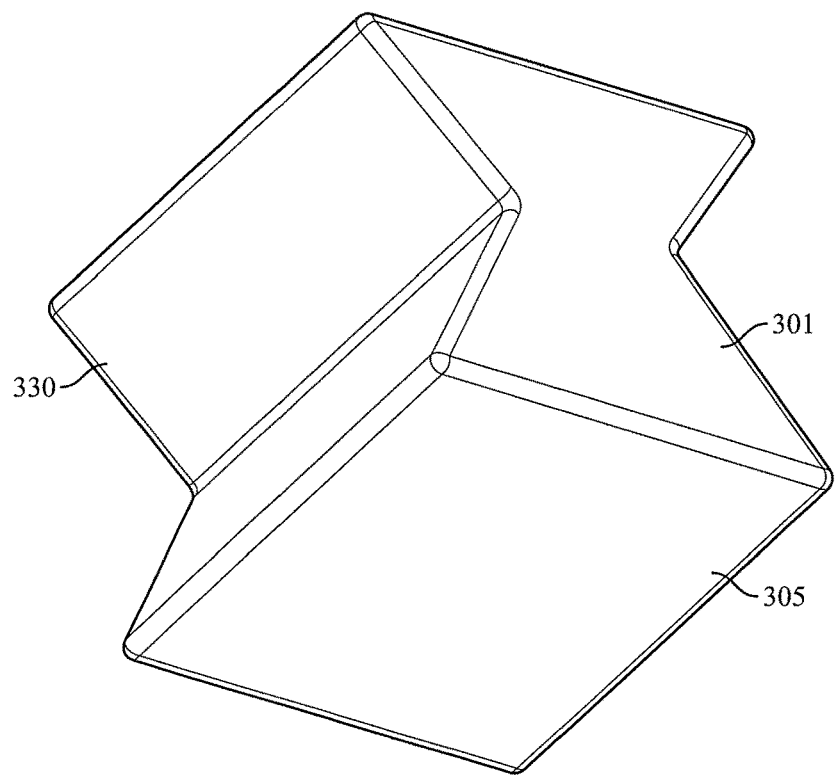
FIG. 14 is a rear perspective of the conventional filter assembly of FIG. 12.
Figure 15:
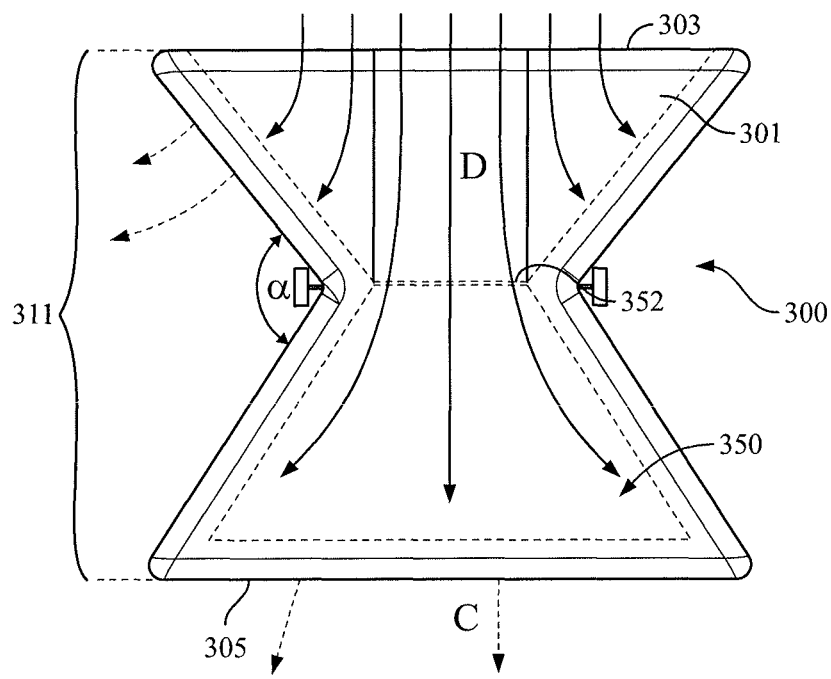
FIG. 15 is a top plan of the conventional filter assembly of FIG. 12, showing internal flow path.
Figure 16:
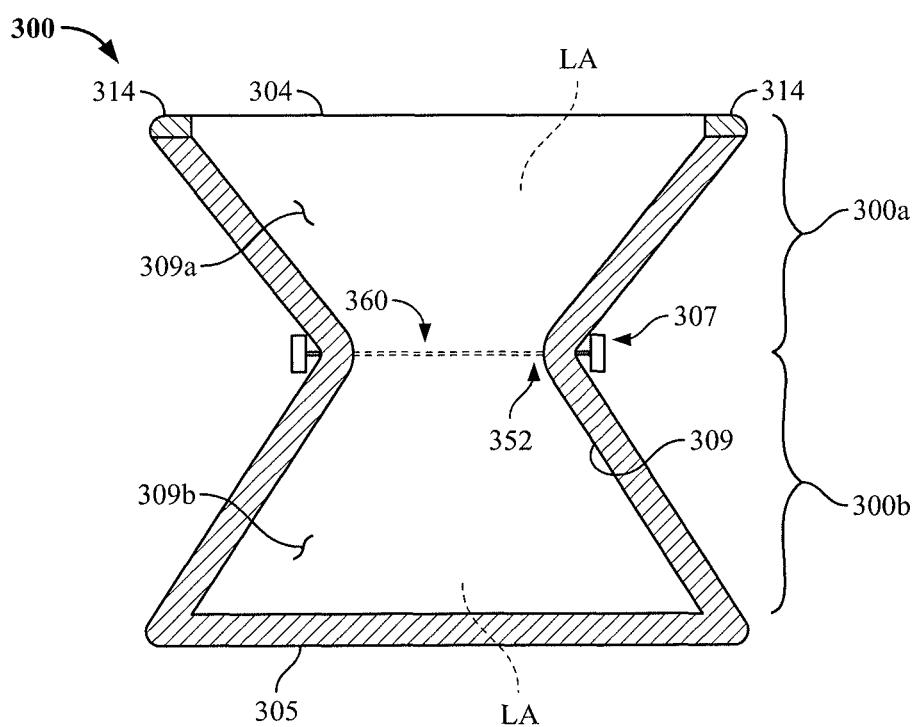
FIG. 16 is a cross section of the conventional filter assembly of FIG. 12.

FIG. 9 is a front elevation of a vane 701 (broadly, a connector) for use with one or more wedges 601 to form a filter support 700, such as shown in FIG. 11. Vane 701 is configured to couple or connect two or more wedges 601 through a filter positioned between the wedges 601. Vane 701 includes an anchor 702 configured to fit through the aperture 604. Anchor 702 is configured to create a strong fit of several pounds. In some embodiments, vane 701 is releasably couplable to wedge 601 and others vane 701 is fixedly coupled to wedge 601.

Vane 701 also includes a conically shaped guide 703. In some embodiments, guide 703 includes a point or spear that enables vane 701 to pierce or move through filter media. In the exemplary embodiment, guide 703 not only is the first portion of vane 701 to be inserted into wedge 601 but it can also serve a pull tab for an operator to use to find their desired opening.

Vane 701 also includes one or more stops 705. In the exemplary embodiment, stop 705 is wide enough that it will not fit through the aperture 604 of wedge 601. Stop 705 is configured to prevent the operator and/or end user from pulling on vane 701 to position wedges completely together.

Vane 701 includes are spacing guides 707. These spacing guides 707 are configured to fit through aperture 604 of wedge 601 such that guide 707 will not go back though (i.e., be backed out of) aperture 604. By way of example, in some embodiments, guide 707 has the same action of a zip tie or security tie. As such, vane 701 enables a user to dictate the interior aperture at the neck of a filter.

Figure 10:
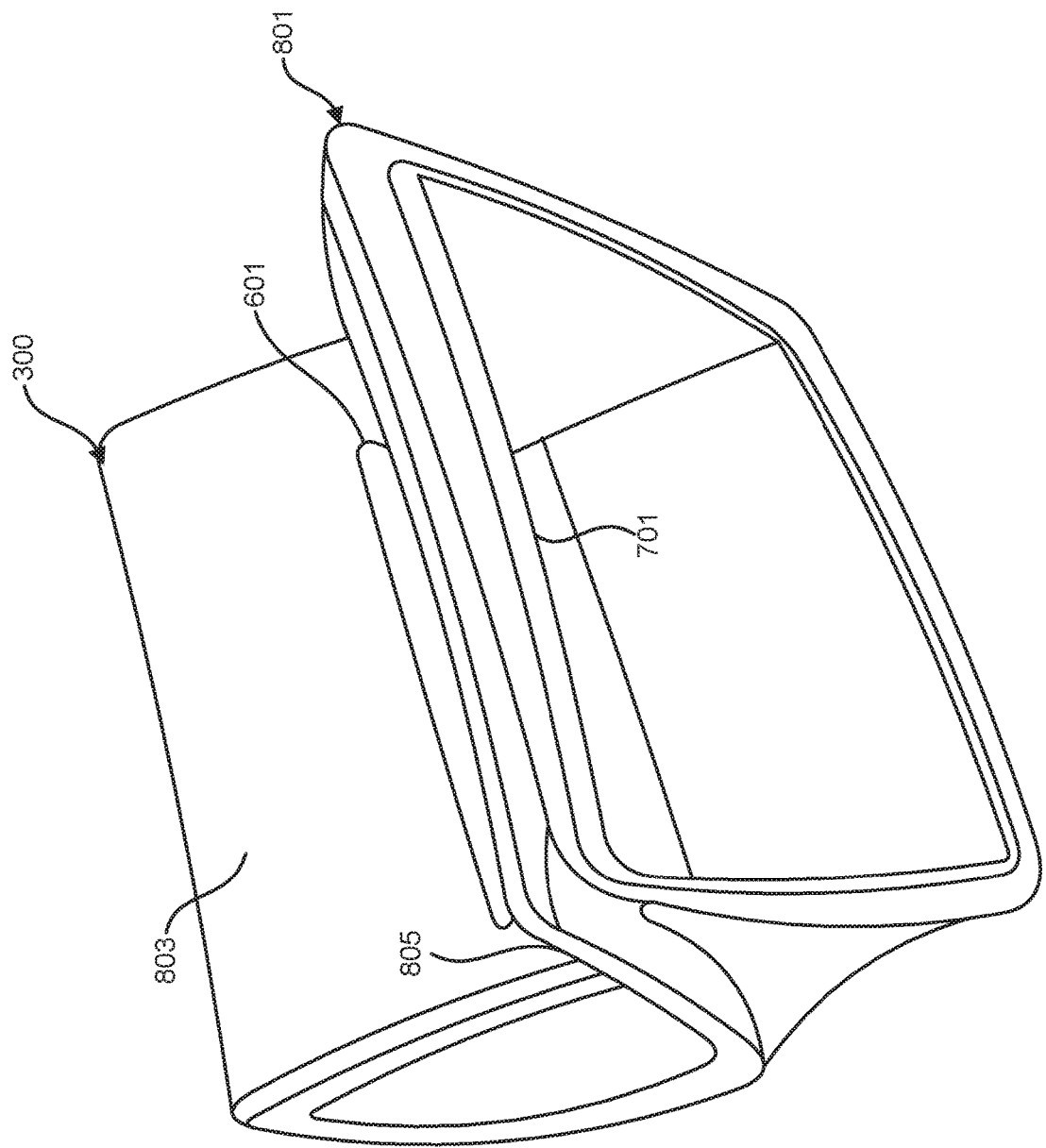
FIG. 10 is a filter assembly including a filter and a filter support including the wedges and the vanes.

FIG. 10 is a perspective view of a filter 801 utilizing wedge 601 and vane 701 (e.g., the filter support 700).

A method of producing a clamp/filter support made for putting around the exterior or integrating into the interior of the filter. The purpose of the clamp/support is to compress or depress the form of the filter to produce a desired shape. Never before has a filter provided a size adjustment for the end user to control the shape or size the desire to extend the life of their filter. The clamp/support will enable a user/manufacture to acquire the desired shape in order to receive the maximum capability of a filter. The Filter clamp/support can be any shape (square, rectangle, triangle, hexagon, octagon, and circle) and size and made of any material (plastic, metal, wood, fiberglass, carbon fiber, foam, and cardboard) that will hold form. The clamp/support can be adjustable allowing for ease of filter modification. The clamp/support can also, have extremities (spikes/cleats) on it to allowing it to grip onto filter media or any other material that is being used. The extremities can also produce support/shape forming for the direct or indirect media being used in the filtering process. The clamp/support can me made from one single piece or multiple different pieces.

The filter support can be produced in manufacturing or added later it can be placed on the interior, exterior, integrated into the media, or a combination of both. The clamp/filter support can be composed of one or multiple different adjustments. The most desired support is one that is universal for all the many different filter sizes and one that can easily be adjusted by the end user to accommodate whatever environment they might be using it in. This is a product that will bring value to out already patented filter A method of producing a wedge/spacer which provides support to so that the filter will hold shape/or form. This will prevent the filter from collapsing or closing in on itself preventing it from premature failure. This wedge/spacer can be included in a clamp or can be done as an independent piece. This can be produced of any material (plastic, foam, glass cardboard, other media, fiberglass, carbon fiber or wood). The wedge/spacer can be located in the interior, exterior, and integrated into the media A method of producing a sleeve which can be integrated into, on, in front of, or behind a filter. The purpose of the sleeve is to catch large amounts of material on primarily the front portion or first stage of filtering. The problem with current filters are they front load which stops flow. The filter sleeve will usually be less expensive then a primary filter. This will allow for extended life of a primary filter, which usually has a higher price point. The Sleeve can also, provide re-directional flow which will allow material to be persuaded to go in desired direction (BOW TIE FILTER). The Sleeve will/can have multiple different openings or a singular opening which will help with strategically desired flow. The sleeve can be made of any type of media/cardboard and can have any shape or size.

The invention claimed is:

1. A filter support comprising:
   first and second wedges configured to engage at least one wall of a filter; and
   a connector extending between and connecting the first and second wedges to one another, wherein the connector is adjustable to change a distance between the first and second wedges to modify at least one of a size and shape of the filter.

2. A filter assembly comprising:
a filter including at least one wall of a filter material configured to filter particulate from an airflow; and
a filter support including
    first and second wedges engaging said at least one wall of the filter, and
    a connector extending between and connecting the first and second wedges to one another, wherein the connector is adjustable to change a distance between the first and second wedges to modify at least one of a size and shape of the filter.

3. A method of configuring a filter assembly comprising:
engaging at least one wall of a filter with first and second wedges, wherein the first and second wedges are connected by an adjustable connector; and
adjusting the adjustable connector to change a distance between the first and second wedges to modify at least one of a size and shape of the filter.

\* \* \* \* \*